United States Patent
Klager

(10) Patent No.: US 6,497,615 B1
(45) Date of Patent: Dec. 24, 2002

(54) FISH SCALING TOOL

(76) Inventor: Gene Klager, 306 Heather La., Conroe, TX (US) 77385

( * ) Notice: Subject to any disclaimer, the term of this patent is extended or adjusted under 35 U.S.C. 154(b) by 0 days.

(21) Appl. No.: 10/104,128

(22) Filed: Mar. 22, 2002

(51) Int. Cl.$^7$ .............................................. A22C 25/02
(52) U.S. Cl. ..................................................... 452/101
(58) Field of Search .............................. 452/94, 97–99, 452/101–103, 105; D15/138, 139, 122, 124, 127, 128, 132; 407/56, 58, 59, 61–63; 433/165, 166; 451/48

(56) References Cited

U.S. PATENT DOCUMENTS

| | | | | |
|---|---|---|---|---|
| 425,372 A | * | 4/1890 | Dillon | 408/215 |
| 1,293,432 A | * | 2/1919 | Higgins | 408/219 |
| 1,630,602 A | * | 5/1927 | Blanco | 407/61 |
| 2,029,514 A | * | 2/1936 | Thomson | 408/217 |
| 2,629,113 A | * | 2/1953 | Chafins | 408/21 |
| 3,072,956 A | * | 1/1963 | Olrich | 452/101 |
| 3,328,834 A | * | 7/1967 | Pulcifer | 452/101 |
| 3,661,471 A | * | 5/1972 | Simonffy | 408/220 |
| 3,667,857 A | * | 6/1972 | Shaner et al. | 408/230 |
| 3,913,196 A | * | 10/1975 | Maday | 144/219 |
| 3,945,069 A | * | 3/1976 | Cecil | |
| 4,107,819 A | | 8/1978 | Saizon | |
| 4,162,558 A | * | 7/1979 | Rubio | |
| 4,285,618 A | * | 8/1981 | Shaney, Jr. | |
| D271,206 S | * | 11/1983 | Devey | D15/138 |
| 4,619,019 A | | 10/1986 | Hardy | |
| D307,020 S | * | 4/1990 | Lyng et al. | D15/139 |
| D379,052 S | * | 5/1997 | Skinner | D15/138 |

* cited by examiner

*Primary Examiner*—Thomas Price
(74) *Attorney, Agent, or Firm*—Mary J. Gaskin

(57) ABSTRACT

A fish scaling tool with a scaling portion and a shank for removable insertion into the chuck of rotary drive device. The cylindrical scaling portion has pointed ridges which spiral (with a slight pitch) around the longitudinal axis of the shank. Equally-spaced longitudinal grooves in the scaling portion provide device for removing scales. Secondary cutting surfaces are provided by equally-spaced longitudinal notches in the scaling portion. A cup-shaped splash guard for deflecting detached scales and water can be attached to the shank of the tool.

7 Claims, 4 Drawing Sheets

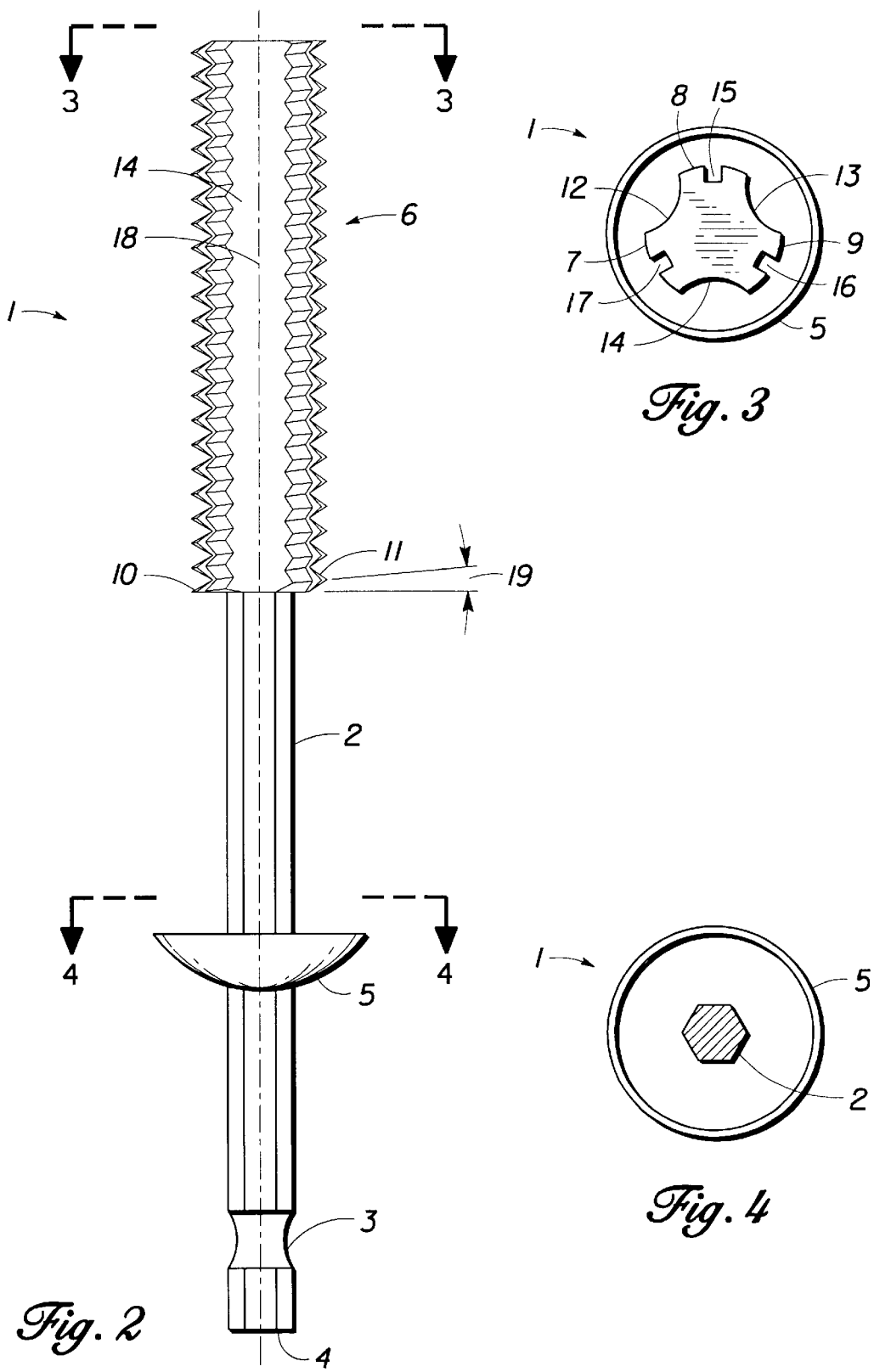

FISH SCALING TOOL

BACKGROUND OF THE INVENTION

Numerous devices have been developed to scale fish. Typically, the motor-driven devices rotate about a longitudinal axis, scraping off the scales with surface protrusions. However, none of the devices has performed in a completely satisfactory manner. Some of the devices simply break off the scales, without removing them, Others harm the skin or flesh of the fish. Others fail to remove small scales.

SUMMARY OF THE INVENTION

The present invention provides a tool with a shank which is removably inserted into the chuck or bit holder of a driving means, which causes it to rotate about the longitudinal axis of the shank. The portion of the tool which removes scales is substantially cylindrical in shape, having pointed ridges, which spiral slightly, extending radially from the shank. Equally-spaced longitudinal grooves interrupt the continuity of the ridges, resulting in cutting surfaces for removing scales. Equally-spaced shallower notches provide secondary cutting surfaces. A splash guard affixed to the shank deflects detached scales away from the user and prevents water from running down the shank into the motor.

In operation, the fish scaling tool is activated and begins to rotate. The user moves the device straight up from the tail of a fish to its head. Removal of each scale, typically occurs as follows: the corner of a ridge lifts up the end of a scale. The ridge then moves the scale laterally to the side in one motion, pulling the scale out of the skin of the fish. The shallower notches catch any remaining parts of the scale and remove them from the skin.

It is an object of the present invention to provide a fish scaler which can remove scales completely from the skin of a fish.

Another object of the present invention is to provide a large number of closely-spaced cutting surfaces to clean fish with small scales.

Still another object of the present invention is to provide a scaling tool which can be used with presently-existing battery-operated or power-operated drill drivers and screwdrivers.

Yet another object of the present invention is to provide cutting edges which lift and laterally pull scales from the skin of the fish.

One more object of the present invention is to provide a splash guard to deflect scales and water.

BRIEF DESCRIPTION OF THE DRAWINGS

FIG. 2 is a side view of the fish scaling tool of the present invention.

FIG. 3 is a top view of the fish scaling tool of the present invention.

FIG. 4 is a cross-sectional view of the fish scaling tool of the present invention.

DESCRIPTION OF PREFERRED EMBODIMENT

Figure 1:
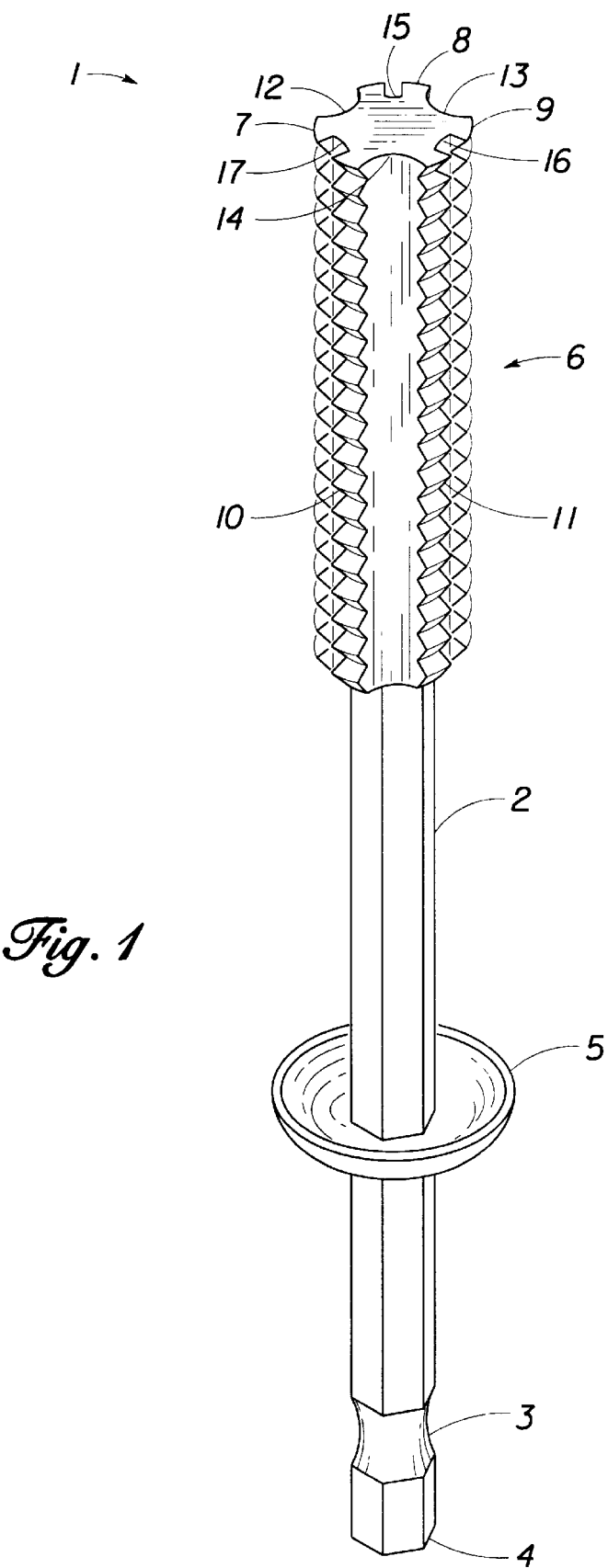
FIG. 1 is a perspective view of the fish scaling tool of the present invention.

As can be seen in FIG. 1, the unitary fish scaling tool 1 of the present invention has a hexagonal shank 2, with a recess 3 at the chuck engaging end 4, which is inserted into the chuck 25 (not shown) of rotary driving means 26 (not shown). The fish scaling tool 1 can also be made with a square shank. The fish scaling tool 1 is generally made of hard synthetic plastic or stainless steel. A cup-shaped splash guard 5 is affixed to the shank 2; the splash guard 5 prevents water from running down the shank 5 to the chuck engaging end 4, and deflects scales away from the user. The splash guard 5 is made from a rigid material, such as hard synthetic plastic or stainless steel; it can be fabricated with the shank of the tool or it can be made to be removable for cleaning. The cylindrical scaling portion 6 has raised scaling surfaces 7, 8, 9 which extend axially from the shank 2. The raised surfaces 7, 9 of the scaling portion 6 have numerous, pointed, closely-spaced spiral ridges 10, 11. Equally-spaced, longitudinal grooves 12, 13, 14 are formed in the scaling end 6, separating the raised surfaces 7, 8, 9 and giving the scaling portion 6 a fluted surface. Shallower, U-shaped notches 15, 16, 17 are cut into each of the raised surfaces 7, 8, 9.

FIG. 2. shows the longitudinal axis 18 about which the fish scaling tool 1 rotates. The scaling portion 6 has rows of ridges 10, 11, which are formed in a spiral around the shank 2, having a slight pitch 19. The pitch is optimally less than 3 ½ degrees. The longitudinal groove 14 which interrupts the ridges 10, 11 is shown, as well as the splash guard 5 and the recess 3 in the chuck engaging end 4.

As seen in FIG. 3, the top view of the fish scaling tool 1, the scaling surfaces 7, 8, 9 are interrupted by equally-spaced, fluted, longitudinal grooves 12, 13, 14. The embodiment shown has three such grooves, but four or more grooves can be formed, as desired. A shallower notch 15, 16, 17 is cut into each of the scaling surfaces 7, 8, 9. The outer edge of the splash guard 5 can be seen.

FIG. 4, the cross-sectional view, shows the splash guard 5 surrounding the hexagonal shank 2.

Figure 5:
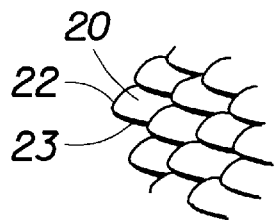
FIG. 5 is a detail showing fish scales on the body of a fish.

In FIG. 5, a fish scale 20 is shown, having an end 22 and a side 23.

Figure 6:
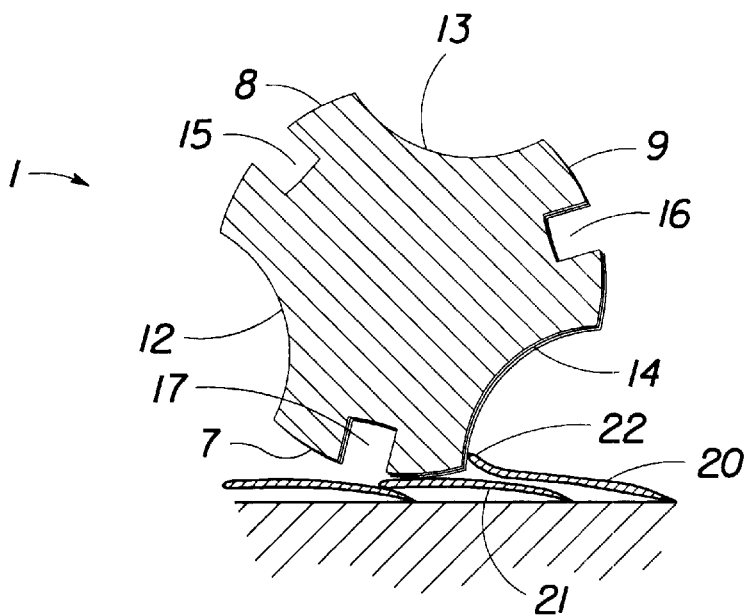
FIG. 6 is a cross-sectional view of the fish scaling tool as it lifts a fish scale.

FIG. 6, a cross-sectional view of the fish scaling tool 1, shows the scaling surfaces 7, 8, 9, interrupted by grooves 12, 13, 14. Each surface 7, 8, 9, has a notch 15, 16, 17. As the fish scaling tool 1 is rotated in a counterclockwise direction, the edge of the groove 14 between scaling surfaces 7 and 9 lifts the end 22 of fish scale 20, away from scale 21. Continued rotation of the fish scaling tool 1 results in contact of fish scale 21 with notch 17.

Figure 7:
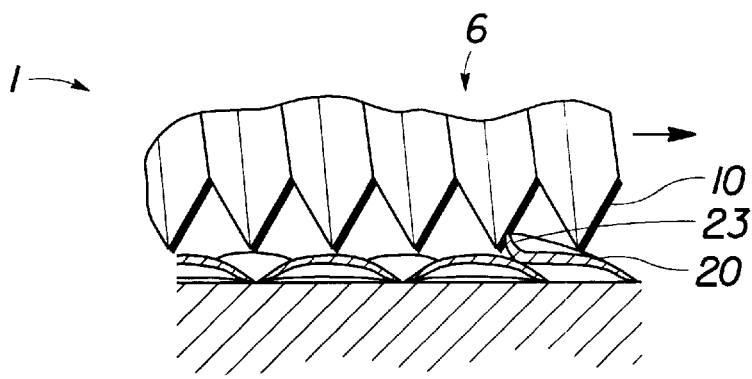
FIG. 7 is a side view of the fish scaling tool as it laterally moves a fish scale.

As can be seen in FIG. 7, the side 23 of the fish scale 20 is moved laterally by the angular pitch of the ridge 10, in an "auguring" motion, and the fish scale 20 is pulled from the body of the fish.

Figure 8:
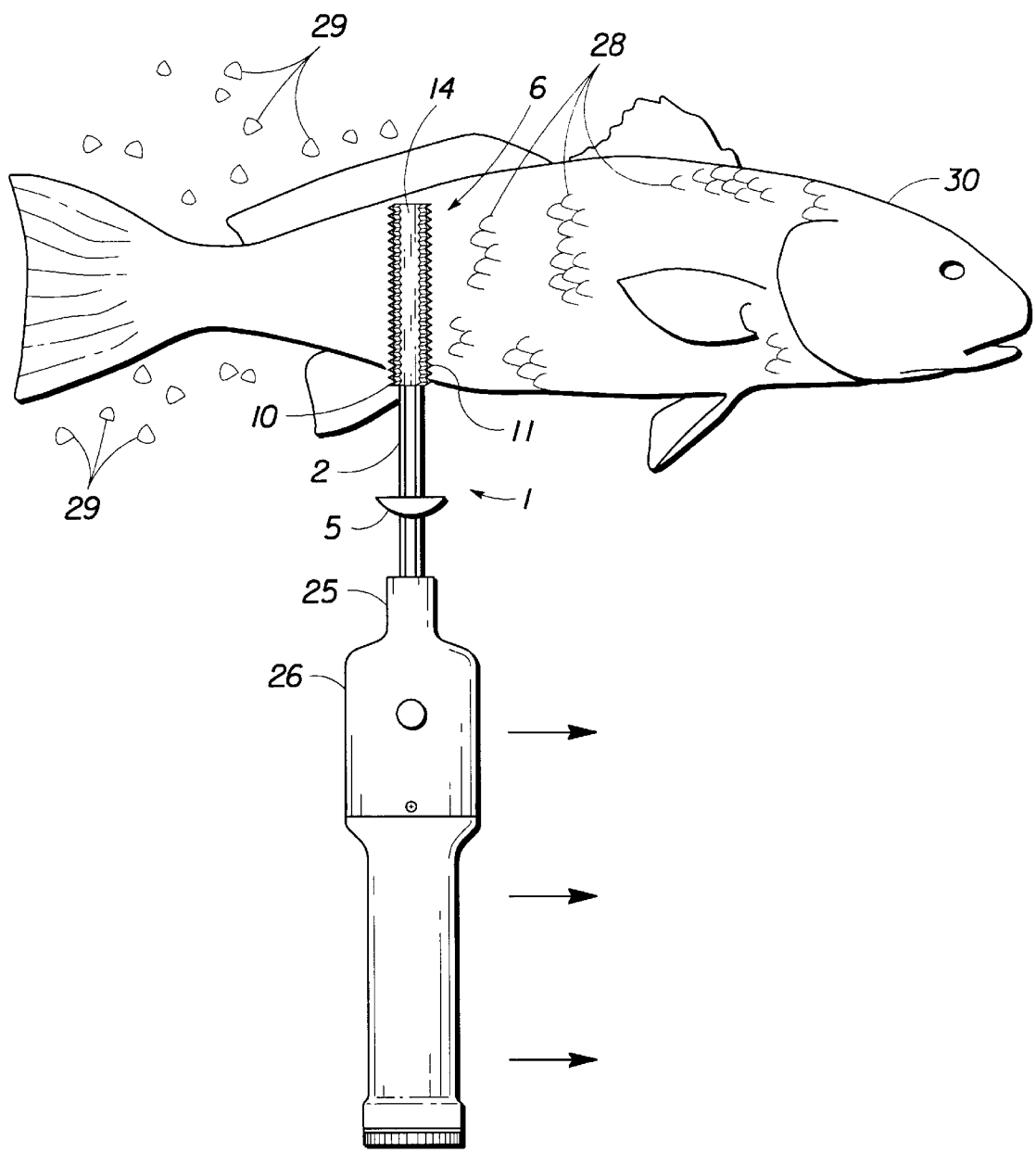
FIG. 8 is a side view of the fish scaling tool as it removes scales from a fish.

FIG. 8 shows the fish scaling tool 1 as it is moved along the body of a fish 30, from its tail to its head. The shank 2 has been inserted into the chuck 25 of driving means 26. The driving means can be operated by electricity or batteries; it can be the means otherwise used to rotate a drill or a screwdriver. The fish scaling portion 6 rotates, and the ridges, such as ridges 10, 11 next to longitudinal groove 14, have removed detached scales 29, and will remove attached scales 28. The splash guard 5 deflects detached scales 29, as well as any water from the fish 30 which may run down the shank 2.

I claim:

1. A fish scaling tool for use with a rotary motor having tool drive means, comprising an elongate body member having a longitudinal axis, said body member further having a shank for removable attachment to the tool drive means for rotation about the longitudinal axis of the body member, the body member further having a raised cylindrical scaling portion, the scaling portion comprising multiple closely-spaced pointed ridges disposed in a spiral around the longitudinal axis of the body member, the body member further having at least three equally-spaced, parallel, straights longitudinal grooves dividing the scaling portion into at least three sections, and the body member further having at least three equally-spaced, parallel, straight, longitudinal notches, one of said notches disposed in each of the sections of the scaling portion.

2. The fish scaling tool of claim 1 wherein the longitudinal grooves are generally fluted in cross-section.

3. The fish scaling tool of claim 1 wherein the longitudinal notches are generally U-shaped in cross-section.

4. The fish scaling tool of claim 1 wherein the ridges have a pitch less than 3 ½ degrees from an axis perpendicular to the longitudinal axis of the body member.

5. The fish scaling tool of claim 1 wherein the tool is fabricated from a material selected from the group consisting of hard synthetic plastic and stainless steel.

6. The fish scaling tool of claim 1 which further comprises a cup-shaped guard disposed around the shank.

7. The fish scaling tool of claim 6 wherein the cup-shaped guard is fabricated from a material selected from the group consisting of hard synthetic plastic and stainless steel.

* * * * *